United States Patent
Sievers et al.

(10) Patent No.: US 9,561,770 B2
(45) Date of Patent: Feb. 7, 2017

(54) DEVICE AND METHOD FOR THE VOLTAGE SUPPLY OF AN OCCUPANT PROTECTION SYSTEM

(75) Inventors: Falko Sievers, Reutlingen (DE); Hartmut Schumacher, Freiberg (DE); Carsten List, Walheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 520 days.

(21) Appl. No.: 14/342,036

(22) PCT Filed: Jul. 4, 2012

(86) PCT No.: PCT/EP2012/063003
§ 371 (c)(1),
(2), (4) Date: Jun. 12, 2014

(87) PCT Pub. No.: WO2013/029840
PCT Pub. Date: Mar. 7, 2013

(65) Prior Publication Data
US 2014/0300184 A1    Oct. 9, 2014

(30) Foreign Application Priority Data
Aug. 31, 2011 (DE) .......... 10 2011 081 904

(51) Int. Cl.
*B60R 21/017* (2006.01)
(52) U.S. Cl.
CPC .................. *B60R 21/017* (2013.01)
(58) Field of Classification Search
CPC .................................... B60R 21/017
USPC ........................................... 307/10.1
See application file for complete search history.

(56) References Cited

U.S. PATENT DOCUMENTS

| | | | | |
|---|---|---|---|---|
| 5,176,214 A | * | 1/1993 | Taufer | B60R 21/01 180/268 |
| 6,125,313 A | * | 9/2000 | Watanabe | B60R 21/0132 280/735 |
| 6,628,007 B1 | * | 9/2003 | Baumgartner | B60R 21/015 180/282 |
| 6,819,992 B1 | * | 11/2004 | Giordano | B60R 21/0173 180/282 |

FOREIGN PATENT DOCUMENTS

DE    102 55 433    6/2004

OTHER PUBLICATIONS

International Search Report, PCT International Application No. PCT/EP2012/063003, dated Sep. 25, 2012.

* cited by examiner

*Primary Examiner* — Jared Fureman
*Assistant Examiner* — Duc M Pham
(74) *Attorney, Agent, or Firm* — Norton Rose Fulbright US LLP; Gerard Messina

(57) ABSTRACT

A device for the voltage supply of an occupant protection system in a motor vehicle having a switching unit and a voltage supply unit, which supplies an operating voltage to the occupant protection system, the switching unit providing a supply voltage to the voltage supply unit when the supply voltage exceeds a predefined threshold value voltage level. A configuration unit is also provided which provides various reference voltage levels for the switching unit as threshold value voltage levels.

10 Claims, 2 Drawing Sheets

DEVICE AND METHOD FOR THE VOLTAGE SUPPLY OF AN OCCUPANT PROTECTION SYSTEM

FIELD

The present invention is directed to a device for the voltage supply of an occupant protection system in a motor, and a method for the voltage supply of an occupant protection system in a motor vehicle.

BACKGROUND INFORMATION

Present control units for occupant protection systems, which, for example, include an airbag system, a seatbelt tightener, a roll bar, etc., generally have the ability to switch the occupant protection system to a so-called "sleep mode" despite the continuously applied battery voltage. Almost no functionality is required in sleep mode and power consumption may be reduced to less than a predefined value of 100 μA, for example. The decision as to whether the system should be active or "asleep" may be made by a voltage monitor, for example, on a separate input terminal pin of an airbag system ASIC (application-specific integrated circuit) in the case of an occupant protection system configured as an airbag system. The airbag system is activated as soon as an applied voltage is detected at this input terminal pin, which is higher than a predefined threshold value of 3V, for example. The airbag system remains deactivated below the predefined threshold value. This voltage threshold for the sleep detection is the default setting and cannot be selected or adjusted for a specific project. In addition to this sleep threshold, which defines the logic decision about an ON state and/or an OFF state of the airbag system, there is also a voltage threshold, which is a function of the specific embodiment for each type of airbag system, above which the full functionality of the airbag system must be ensured. A distinction is made in principle between "6 V devices" and ">6 V devices." The "6 V devices" are characterized in that they are fully functional above a supply voltage of approximately 6 V due to optimized and more cost-intensive input filters on the power supply. The ">6 V devices" do not meet this requirement until the voltage supply is approximately 7 V.

If the supply voltage is below 6 V or 7 V, the airbag system is already partially activated by exceeding the sleep threshold of approximately 3 V, but it is impossible to ensure that the airbag system will reach a state of full readiness. Thus, a great deal of heat may develop or radiation of EMC in the airbag system may be increased. There is only the option of activating or stopping functions of the airbag system which are controlled by a software program running in the control unit. However, this does not apply to the circuit parts, which are independent of the software programs, such as the central voltage supply of the occupant protection system.

German Patent Application No. DE 102 55 433 A1 describes a method for operating a voltage supply circuit in a power saving mode, in which the power consumption is reduced in comparison with regular operation. The voltage supply circuit includes a voltage transformer having a voltage transformer switch, which is controllable for the voltage transformer operation, and a voltage transformer capacitor and an in-phase regulator downstream from the voltage transformer for supplying voltage to a consumer, in particular a microprocessor. The voltage supply circuit may be used for safety devices, for example, airbags, seatbelt tighteners or roll bars. To reduce the power consumption, instead of the regular voltage transformer operation, its voltage transformer switch is operated together with the in-phase regulator as a two-point regulator with regard to the output voltage generated at the output of the voltage transformer. The conventional two-point regulation is preferably implemented in such a way that detection means for detecting the voltage generated at the output of the first voltage transformer and control means and detection means are provided, which activate the voltage transformer switch when the detection means indicate a voltage value below the first threshold value and deactivate it when the detection means indicate a voltage value above a second voltage value. The voltage transformer switch may be triggered via a comparator, for example.

SUMMARY

An example device according to the present invention for the voltage supply of an occupant protection system for a motor vehicle and an example method according to the present invention for the voltage supply of an occupant protection system for a motor vehicle may have the advantage that the entire occupant protection system is activated only above a sufficiently high supply voltage level and is or remains deactivated if the supply voltage level is too low. Thus, if the supply voltage level is below the specified voltage range, then the central voltage supply to the occupant protection system is deactivated and there is no "attempt" to permanently maintain the full functionality of the occupant protection system. Thus robust system states may be ensured even when there is an under-supply of voltage. The occupant protection system is thus either fully functional, depending on the supply voltage, or remains or becomes completely deactivated.

The core of the present invention is that the supply voltage of the occupant protection system is activated only above a threshold voltage level, which is demanded by the customer and is implemented by a corresponding hardware design. It is thus possible to ensure at any point in time that the occupant protection system is fully functional in accordance with specifications and does not enter an undefined intermediate state in which only a limited functionality is available and undesirable effects may even occur, such as excess temperatures, for example. The robustness of the occupant protection system is therefore definitely improvable. The costs of the occupant protection system may also be reduced since optimized and cost-intensive components for the under-voltage state may be eliminated or necessary cooling measures may be omitted. The threshold value voltage level beyond which the occupant protection system is to be activated or deactivated may be predefined as a function of the specific embodiment of the occupant protection system.

Specific embodiments of the present invention advantageously implement an additional configuration unit for the threshold value voltage level. Depending on customer specifications, the threshold value voltage level may be selected, for example, in such a way that the occupant protection system is activated only above a supply voltage level of 7 V, for example, and when the supply voltage drops below this threshold, it is put into the sleep mode, in which the active power supply to the occupant protection system is stopped. It is thus possible to achieve the result that customer specifications are fully met and the occupant protection system is not unnecessarily burdened or made more expensive. The burden would result, for example, from the fact that the unaltered occupant protection system in the under-voltage state would exhibit a much greater power consumption and intrinsic heating. This could be reduced without the specific embodiments of the present invention only by improving the wiring in the voltage supply unit through optimized components having lower voltage losses, etc., thus making them more expensive. The specific embodiments of the present invention make it possible to largely avoid this increase in cost of the wiring, which is necessary only in specific embodiments of occupant protection systems which must in fact be activated at the lowest supply voltage levels. Each occupant protection system may thus be optimized in terms of costs and the power loss.

Thus, for example, at least two different selectable threshold value voltage levels may be provided, which may be used for activation and deactivation of the voltage supply unit. Depending on the specific embodiment of the occupant protection system, it is then possible to select between these two threshold value voltage levels. Specific embodiments of the present invention may thus be adapted easily and quickly to occupant protection systems configured in various ways.

Specific embodiments of the present invention make available a device for the voltage supply of an occupant protection system in a motor vehicle, including a switching unit and a voltage supply unit, which supplies an operating voltage to the occupant protection system. The switching unit of the voltage supply unit makes available a supply voltage when the supply voltage exceeds a predefined threshold value voltage level. A configuration unit which supplies various reference voltage levels as the threshold value voltage level for the switching unit are provided according to the present invention.

Furthermore, specific embodiments of the present invention make available a method for the voltage supply of an occupant protection system in a motor vehicle, which includes a switching unit and a voltage supply unit, which supplies an operating voltage to the occupant protection system, the switching unit supplying a supply voltage to the voltage supply unit when the supply voltage exceeds a predefined threshold value voltage level. In accordance with the present invention, various reference voltage levels are made available as the threshold value voltage level for the switching unit, one of them being selected as a function of the prevailing specific embodiment of the voltage supply unit and the occupant protection system and compared with a prevailing level of the supply voltage.

It may be particularly advantageous if the reference voltage levels and thus the associated threshold value voltage levels may be selected in such a way that a level of the supply voltage, which is applied to the voltage supply unit, and a level of the resulting operating voltage, which is applied to the occupant protection system, permit complete functionality of the voltage supply unit and of the occupant protection system.

In an advantageous embodiment of the device according to the present invention, comparator means may be provided which compare a prevailing level of the supply voltage with the reference voltage level and generate a switching signal for a switching element when the prevailing level of the supply voltage exceeds the reference voltage level, the switching element applying the supply voltage to the voltage supply unit in the switched state. These comparator means are designed as comparators, for example, whereby a cost-efficient implementation of the comparator means is made possible.

In another advantageous embodiment of the device according to the present invention, the configuration means may include a selector, which selects an associated reference voltage level as a function of a selected configuration. In addition, the configuration means may include switching threshold specification unit, which outputs the selected reference voltage level to the switching unit. Furthermore, the selector may output a configuration signal to the switching threshold specification unit which represents the selected reference voltage level. The configuration signal may be implemented as a configuration voltage, for example, which has at least two different voltage levels and is applied to at least one terminal pin of the switching threshold specification means. A first configuration here is represented by configuration voltage levels which are below a predefined threshold value between the at least two voltage levels, and a second configuration is represented by configuration voltage levels corresponding to or being greater than the predefined threshold value.

Alternatively, the configuration signal may be generated as a data signal by an implemented software program, in which the data signal includes a predefinable number of valid data words which are each assigned to a reference voltage level.

In an advantageous example embodiment of the method according to the present invention, the reference voltage levels and thus the associated threshold value voltage levels are selected in such a way that one level of the supply voltage, which is applied to the voltage supply unit, and one level of the resulting operating voltage, which is applied to the occupant protection system, permit full functionality of the voltage supply unit and of the occupant protection system.

Exemplary embodiments of the present invention are illustrated in the figures and explained in greater detail below. In the figures, the same reference numerals denote the same components or elements, which carry out the same or similar functions.

DETAILED DESCRIPTION OF EXAMPLE EMBODIMENTS

The voltage supply concept of present occupant protection systems provides for the occupant protection system to start operation above a minimum battery voltage of approximately 3 V, regardless of the voltage range in which functionality is demanded by the customer. This means that each occupant protection system attempts to start operation of all circuit parts above this voltage threshold. However, based on the extremely low input voltage, it is impossible to ensure that the condition of full functionality is achieved. Thus, under some circumstances, a system state may occur in which even the smallest change in the battery voltage has effects on the functionality of the occupant protection system. With the aid of internal voltage monitoring and voltage analysis, it is possible to ensure that there is no critical malfunction, but it is impossible to actively leave this intermediate state of the occupant protection system, which is not fully functional.

Figure 1:
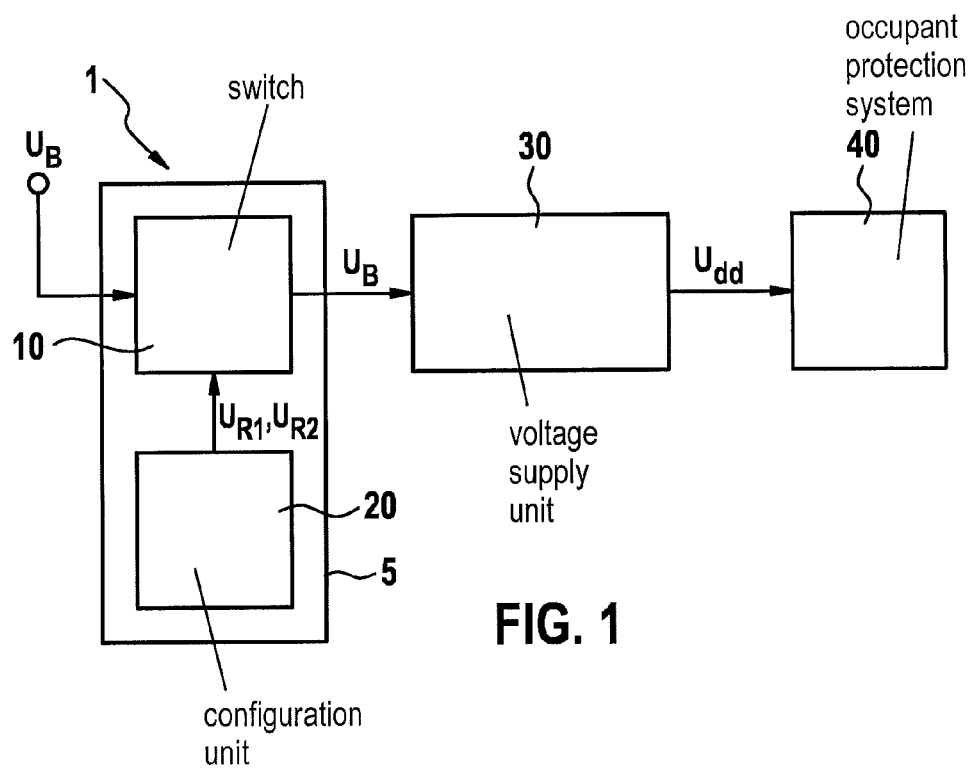
FIG. 1 shows a schematic block diagram of an exemplary embodiment of a device according to the present invention for the voltage supply of an occupant protection system.
Figure 2:
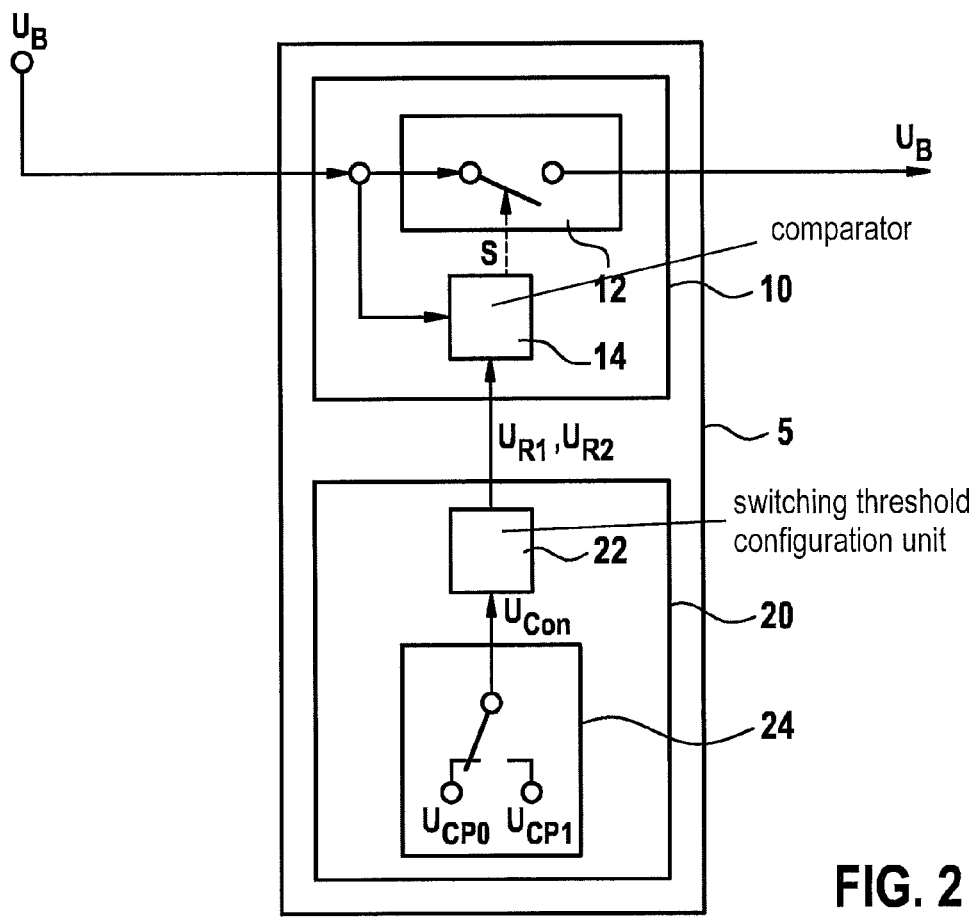
FIG. 2 shows a schematic block diagram of an exemplary embodiment of an activation unit for the device for the voltage supply of an occupant protection system according to FIG. 1.

As is apparent from FIGS. 1 and 2, the exemplary embodiment of a device 1 shown here for the voltage supply of an occupant protection system 40 in a motor vehicle includes a switching unit 10 and a voltage supply unit 30, which supplies an operating voltage $U_{dd}$ to occupant protection system 40, switching unit 10 supplying a supply voltage $U_B$ to voltage supply unit 30 when supply voltage $U_B$ exceeds a predefined threshold value voltage level $U_{B1}$, $U_{B2}$. Supply voltage $U_B$ is generated by a vehicle battery (not shown) and/or a generator (not shown) in the vehicle. In addition, voltage supply unit 30 and occupant protection system 40 may include circuit parts (not shown), which ensure an emergency supply to occupant protection system 40 in the event of failure of supply voltage $U_B$ in a crash.

According to the present invention, a configuration unit 20 is provided, which supply various reference voltage levels $U_{R1}$, $U_{R2}$ as threshold value voltage levels $U_{B1}$, $U_{B2}$ for switching unit 10. Reference voltage levels $U_{R1}$, $U_{R2}$ and thus associated threshold voltage levels $U_{B1}$, $U_{B2}$ are selected in such a way that a level of supply voltage $U_B$, which is applied to voltage supply unit 30 and a level of resulting operating voltage $U_{dd}$, which is applied to occupant protection system 40, permit full functionality of voltage supply unit 30 and of occupant protection system 40. For "6 V devices," reference voltage level $U_{R1}$, $U_{R2}$ and thus associated threshold value voltage level $U_{B1}$, $U_{B2}$ are selected, for example, in such a way that the level of supply voltage $U_B$ applied to the voltage supply unit is at least 6 V. For "<6 V devices," reference voltage level $U_{R1}$, $U_{R2}$ and thus associated threshold value voltage level $U_{B1}$, $U_{B2}$ are selected in such a way that the level of supply voltage $U_B$ applied to voltage supply unit 30 is at least 7 V. In the exemplary embodiment illustrated here, switching unit 10 and configurator 20 are combined into an activation unit 5, which applies supply voltage $U_B$ to voltage supply unit 30, depending on predefined criteria.

As is apparent from FIG. 2, comparator 14 is situated in switching unit 10, which compares a prevailing voltage of supply voltage $U_B$ with selected reference voltage level $U_{R1}$, $U_{R2}$ and generate a switching signal S for a switching element 12 when the prevailing level of supply voltage $U_B$ exceeds selected reference voltage level $U_{R1}$, $U_{R2}$. In the open state illustrated here, voltage supply unit 30 is not supplied with supply voltage $U_B$. Only in the switched state (not shown here) does switching element 12 apply supply voltage $U_B$ to voltage supply unit 30. Voltage supply unit 30 then generates operating voltage $U_{dd}$ for occupant protection system 40 from applied supply voltage $U_B$.

Configurator 20 includes a selection unit 24, which selects an associated reference voltage level $U_{R1}$, $U_{R2}$ as a function of a selected configuration C0, C1. With a first configuration C0, which represents a "6 V device," for example, a first reference voltage level $U_{R1}$ of approximately 6 V is selected. With a second configuration C1 representing a ">6 V device," for example, a second reference voltage level $U_{R2}$ of approximately 7 V is then selected. In addition, configurator 20 includes switching threshold specification unit 22, which outputs selected reference voltage level $U_{R1}$, $U_{R2}$ to switching unit 10. For selection of reference voltage level $U_{R1}$, $U_{R2}$, selection unit 24 outputs a configuration signal $U_{Con}$ to switching threshold specification means 22, which represents selected reference voltage level $U_{R1}$, $U_{R2}$.

As is also apparent from 2, selected reference voltage level $U_{R1}$, $U_{R2}$ is applied to comparator 14 of switching unit 10. If switching threshold specification unit 22 applies first reference voltage level $U_{R1}$ to comparator 14, then comparator 14 generates switching signal S for switching element 12 when the prevailing level of supply voltage $U_B$ reaches or exceeds first threshold value voltage level $U_{B1}$. If switching threshold specification unit 22 applies a second reference voltage level $U_{R2}$ to comparator means 14, then comparator 14 generates a switching signal S for switching element 12 when the prevailing level of supply voltage $U_B$ reaches or exceeds second threshold value voltage level $U_{B2}$.

Figure 3:
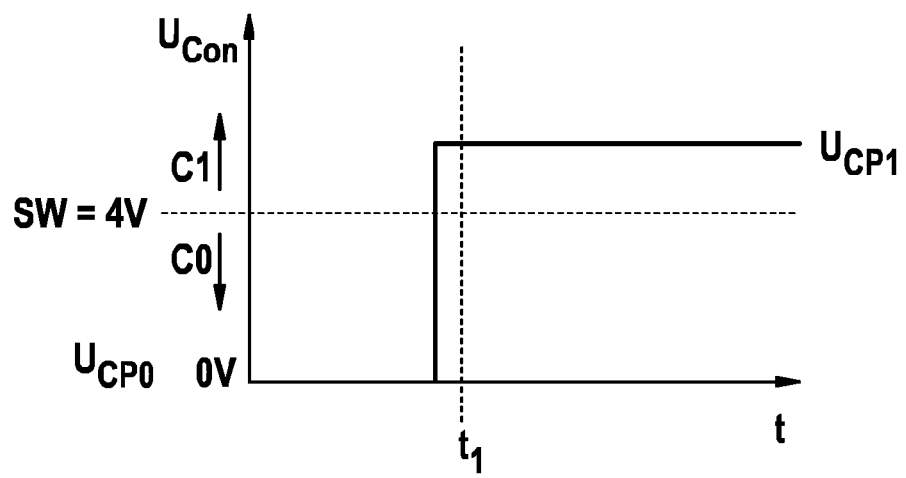
FIG. 3 shows a characteristic line diagram of a configuration signal for the activation unit from FIG. 2.

In the exemplary embodiment shown here, selection unit 24 has a changeover switch which is switchable between two switched states, each supplying a predefined voltage level $U_{CP0}$, $U_{CP1}$. Configuration signal $U_{Con}$ is therefore implemented as a configuration voltage having at least two different voltage levels $U_{CP0}$, $U_{CP1}$ applied to at least one terminal pin of switching threshold specification unit 22. First configuration C0 is represented by configuration voltage levels, which are below a predefined threshold value SW between at least two voltage levels $U_{CP0}$, $U_{CP1}$. As is apparent from FIG. 3, a first voltage level $U_{CP0}$ or a voltage of approximately 0 V and a second voltage level $U_{CP1}$ correspond to a voltage of approximately 5 V, for example, and threshold value SW corresponds to a level of approximately 4 V, for example. Second configuration C1 is represented by configuration voltage levels, which correspond to predefined threshold value SW or are greater than predefined threshold value SW. In the exemplary embodiment shown here, first configuration C0, corresponding to a "6 V operation," or second configuration C1, corresponding to a ">6 V operation," is ascertained at a fixed point in time t1 during the initialization of device 1 for the voltage supply. This ascertainment is carried out as a function of a prevailing configuration voltage level $U_{CP0}$, $U_{CP1}$, which is applied as a configuration signal $U_{Con}$ to a configuration terminal pin of switching threshold specification unit 22. In the exemplary embodiment shown here, second configuration voltage $U_{CP1}$ is applied at point in time t1 to the configuration terminal pin of switching threshold specification unit 22. In a simple implementation of first configuration voltage level $U_{CP0}$, the configuration terminal pin of switching threshold specification unit 22 may be short-circuited to ground via selection unit 24. For implementation of second configuration voltage level $U_{CP1}$, the configuration terminal pin of switching threshold specification unit 22 may be connected to a fixed voltage level of an internal supply voltage of approximately 5 V via selection unit 24. For the remaining duration of the voltage supply, set configuration state C0, C1 is frozen, i.e., there is no transition between first configuration C0 and second configuration C1 during operation or vice versa. Only in the event of a complete reset operation of device 1 to the voltage supply is a set configuration state C0, C1 deleted and re-entered for a restart of device 1 for the voltage supply.

Figure 4:
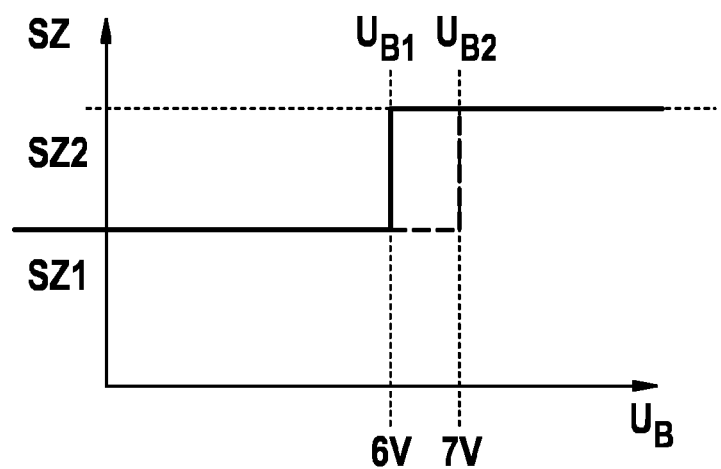
FIG. 4 shows a characteristic line diagram of system states of a switching unit of the activation unit from FIG. 2.

As is apparent from FIG. 4, specific embodiments of the present invention have at least two different threshold value voltage levels $U_{B1}$, $U_{B2}$, which may be used for activation and deactivation of voltage supply unit 30. It is then possible to select between these thresholds for specific projects. The corresponding configuration C0, C1 takes place in the illustrated exemplary embodiment via the configuration terminal pin, which is provided specifically for this purpose and reports the various logic states, depending on the applied level of configuration signal $U_{Con}$, to comparator unit 14. If first voltage level $U_{CP0}$ of approximately 0 V is detected on this configuration terminal pin, for example, then first threshold value voltage level $U_{B1}$ of approximately 6 V is set.

This means that comparator unit 14 generates switching signal S for switching element 12 and switch switching unit 10 from an open first switching state SZ1 to a closed second switching state SZ2 when the prevailing level of supply voltage $U_B$ reaches or exceeds first threshold value voltage level $U_{B1}$ of approximately 6 V. If second voltage value level $U_{CP1}$ of approximately 5 V is applied to the configuration terminal pin, then second threshold value voltage level $U_{B2}$ of approximately 7 V is set. This means that comparator unit 14 generate switching signal S for switching element 12 and switch switching unit 10 from an open first switching state SZ1 to a closed second switching state SZ2 when the prevailing level of supply voltage $U_B$ reaches or exceeds a second threshold value voltage level $U_{B2}$ of approximately 7 V. The configuration terminal pin may be analyzed in comparator means 14 using comparators.

In a specific alternative specific embodiment of the device according to the present invention (not shown here), configuration signal $U_{Con}$ is generated as a data signal by an implemented software program. The data signal includes a predefinable number of valid data words, each of which is assigned to a reference voltage level $U_{R1}$, $U_{R2}$. Depending on desired reference voltage level $U_{R1}$, $U_{R2}$ the corresponding data word is then applied to comparator means 14 in switching unit 10.

Specific embodiments of the present invention offer the option of activating or deactivating the entire occupant protection system only above a sufficiently high supply voltage. If the supply voltage is below the specified range, the central voltage supply of the occupant protection system is deactivated and there is no "attempt" to maintain the full functionality permanently (because it is not required by the customer). Robust system states may thus be ensured even at a given under-voltage. The occupant protection system is thus either fully functional or it is or remains fully deactivated, depending on the available supply voltage.

What is claimed is:

1. A device for the voltage supply of an occupant protection system in a motor vehicle, comprising:
   a switching unit and a voltage supply unit which supplies an operating voltage to the occupant protection system, the switching unit of the voltage supply unit supplying a supply voltage when the supply voltage exceeds a predefined threshold value voltage level; and
   a configuration unit which supplies various reference voltage levels as the threshold value voltage levels for the switching unit.

2. The device as recited in claim 1, wherein the reference voltage levels and the associated threshold value voltage levels are selected in such a way that a level of the supply voltage which is applied to the voltage supply unit and a level of the resulting operating voltage which is applied to the occupant protection system permit a complete functionality of the voltage supply unit and of the occupant protection system.

3. The device as recited in claim 1, further comprising:
   a comparator to compare a prevailing level of the supply voltage with the reference voltage level and generate a switching signal for a switching element when the prevailing level of the supply voltage exceeds the reference voltage level, the switching element to apply the supply voltage to the voltage supply unit in a switched state.

4. The device as recited in claim 1, wherein the configuration unit includes a selector which selects an associated reference voltage level as a function of a selected configuration.

5. The device as recited in claim 4, wherein the configuration unit includes a switching threshold specification unit which outputs the selected reference voltage level to the switching unit.

6. The device as recited in claim 5, wherein the selector outputs a configuration signal to the switching threshold specification unit which represents the selected reference voltage level.

7. The device as recited in claim 6, wherein the configuration signal is implemented as a configuration voltage, which has at least two different voltage levels and is applied to at least one terminal pin of the switching threshold specification means, a first configuration being represented by configuration voltage levels, which are below a predefined threshold value between the at least two voltage levels, and a second configuration is represented by configuration voltage levels corresponding to the predefined threshold value or are greater than the predefined threshold value.

8. The device as recited in claim 6, wherein the configuration signal is generable as a data signal by an implemented software program, the data signal including a predefinable number of valid data words, each being assigned to a reference voltage level.

9. A method for a voltage supply of an occupant protection system in a motor vehicle, the voltage supply including a switching unit and a voltage supply unit, which makes available an operating voltage to the occupant protection system, the method comprising:
   supplying, the switching unit, a supply voltage to the voltage supply unit when the supply voltage exceeds a predefined threshold value voltage level; and
   making available different reference voltage levels as threshold value voltage levels for the switching unit, one of which is selected as a function of the prevailing specific embodiment of the voltage supply unit and the occupant protection system and is compared with a prevailing level of the supply voltage.

10. The method as recited in claim 9, wherein the reference voltage levels and thus the associated threshold value voltage levels are selected in such a way that a level of the supply voltage which is applied to the voltage supply unit and a level of a resulting operating voltage which is applied to the occupant protection system permit full functionality of the voltage supply unit and of the occupant protection system.

* * * * *